United States Patent
Chang et al.

(10) Patent No.: US 6,621,522 B1
(45) Date of Patent: Sep. 16, 2003

(54) ADJUSTABLE FIXING DEVICE OF A CCD PLATE

(75) Inventors: Hung-Chia Chang, Taipei (TW); Lung Chen, Taipei (TW); Po-Chih Chang, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/299,914

(22) Filed: Apr. 28, 1999

(51) Int. Cl.[7] .................... H04N 5/225; H04N 1/024
(52) U.S. Cl. ............................ 348/374; 358/474
(58) Field of Search ............................ 348/374, 373; 358/475, 480–483, 474

(56) References Cited

U.S. PATENT DOCUMENTS

| | | | | |
|---|---|---|---|---|
| 4,769,711 A | * | 9/1988 | Date ........................ | 348/374 |
| 5,828,409 A | * | 10/1998 | North et al. ................ | 348/374 |
| 5,936,239 A | * | 8/1999 | Tsai et al. .................. | 250/239 |
| 5,952,714 A | * | 9/1999 | Sano et al. ................. | 257/686 |
| 6,275,388 B1 | * | 8/2001 | Hennick et al. ............ | 361/807 |
| 6,343,162 B1 | * | 1/2002 | Saito et al. ................ | 358/482 |

* cited by examiner

Primary Examiner—Andrew Christensen
Assistant Examiner—Nhan Tran
(74) Attorney, Agent, or Firm—Rosenberg, Klein & Lee

(57) ABSTRACT

Disclosed is an adjustable fixing device of a CCD plate comprising at least a central supporter and a mask device. The central supporter is made of non-transparency material. The mask device and the central supporter are approximately combined by a supporting device. The mask device and the central supporter are moved with respect to one another in a traveling range. An adhesive agent is filled to the place between the mask device and the central supporter for combining the mask device and the central supporter in a fixing position in the traveling range. Thereby, the central supporter is made of non-transparency material without needing to be performed with light shield process or installed with light shield element for effectively reducing cost. A preferred guiding structure is formed between the central supporter and the mask device for guiding the central supporter and the mask device so that they may move steadily. A larger adhesive area is formed between the central supporter and the mask device so that the central supporter and the mask device are more steadily combined.

13 Claims, 8 Drawing Sheets

ADJUSTABLE FIXING DEVICE OF A CCD PLATE

BACKGROUND OF THE INVENTION

1. Field of the Invention

The present invention relates to an adjustable fixing device of a CCD (charge coupling device) plate for precisely aligning an CCD element so that an optic system may be operated normally, the cost is reduced effectively and the combination becomes more steadily.

2. Description of the Prior Art

As shown in FIG. 1, a prior art optic scanner is illustrated. The optic scanner includes a scanner mask device 10a, a central supporter 11a, a sensor mask device 12a and a CCD plate 13a. A lens 14a is fixed within the scanner mask device 10a. The CCD plate 13a is fixed with a CCD element 15a for picking up the image light passing through the lens 14a.

The central supporter 11a is made of ultraviolet materials. The sensor mask device 12a and the central supporter 11a are roughly combined by the supporting devices 16a and 17a on the two sides thereof. The sensor mask device 12a and the central supporter 11a are moved with respect to one another within a traveling range. The central supporter 11a is adhered to the scanner mask device 10a by the clamping elements 18a at two sides. The central supporter 11a and the scanner mask device 10a are movable with respect to one another within a traveling range.

The sensor mask device 12a and the central supporter 11a are fixed to a fixed position in the traveling range, then, liquid adhesive agent (not shown) is filled therebetween. The combining element is an adhesive agent which will harden by radiating of ultraviolet light so that the sensor mask device 12a and the central supporter 11a are fixed to the respective positions. The central supporter 11a and the scanner mask device 10a are fixed in a fixed position in the traveling range. Then, liquid combining element is an adhesive agent which will harden after being emitted by ultraviolet so that the scanner mask device 10a and the central supporter 11a are fixed to a respective position.

In the aforementioned prior art, by an adhesive agent active by ultraviolet for fixing the sensor mask device 12a to a central supporter 11a and then the central supporter 11a is fixed to the optic scanner mask device 10a. Since the adhesive agent will present as a liquid after being emitted by ultraviolet, thus the CCD element 15a can be controlled in five degrees of freedom (X direction, Y direction, Z direction, orientation rotary around Z axis, and orientation rotary around Y direction) so that the CCD element 15a can be aligned precisely so that the system may operate normally. Since the central supporter 11a is formed by a material which is transparent to ultraviolet light. In using the scanner, light will pass through the optic path within the central supporter 14 so that the image light through the lens 14a to the CCD element 15a. Thus, the prior art is not practical. Although the central supporter 11a may be processed by a light shielding procedure or installed with light shielding element for preventing the outer light to transmit to the interior of the supporting frame. But this will cause the increment of cost.

Moreover, the sensor mask device 12a is not convenient to hold a fixture.

Besides. The sensor mask device 12a and the central supporter 11a are roughly combined by the supporting devices 16a and 17a at two sides so that the sensor mask device 12a may move along Y direction and rotate around Z axis. But since the sensor mask device 12a and the central supporter 11a are not be well guided, Thus, the motion therebetween is not stable.

Furthermore, the sensor mask device 12a and the central supporter 11a are only filled liquid combining element on the through holes at two sides, as a result of a smaller adhering area the combination between the central supporter 11a and the sensor mask device 12a are unstably.

SUMMARY OF THE INVENTION

Accordingly, the object of the present invention is to provide an adjustable fixing device of a CCD plate comprising at least one central supporter and a sensor mask device. The central supporter is made of non-transparency material and an adhesive agent is used to combine the central supporter and the sensor mask device. Since the central supporter is made of non-transparency material, thus the outer light will not transmit to the inner part thereof. The central supporter needs not be processed with a light shield procedure or installed with a light shield element. Thus, the cost is reduced effectively.

Another object of the present invention is to provide an adjustable fixing device of a CCD plate, the sensor mask device is installed with two inclined surface and a plurality of positioning pillars for holding fixtures. A further object of the present invention is to provide an adjustable fixing device of a CCD plate. The upper and lower portions of the sensor mask device are formed with respective pillars, the two pillars are matched to the two grooves of the central supporters so as to form with as a preferred guiding structure for guiding the sensor mask device and the central supporter to steadily move along Y direction and rotate around Z axis.

A still object of the present invention is to provide an adjustable fixing device of a CCD plate. Two clamping pieces are installed on the two sides of the central supporter. Each of two sides of the sensor mask device is installed with a respect ear. The sensor mask device is inserted into the two clamping pieces on the two sides of the central supporter by the two ears. The upper clamping pieces are installed with respect first through holes. The two ears on the sensor mask device are installed with respect second through holes. A plurality of spaced third trenches are installed on the periphery of the second through holes on the top and lower surface of the ear. The first through hole, second through hole and third trenches serves to contain an adhesive agent. The design of the third trenches serves to increase the adhesive area between the ears of the sensor mask device and the clamping pieces of the central supporter so that the central supporter and the sensor mask device are combined more steadily.

A yet object of the present invention is to provide an adjustable fixing device of a CCD plate. A plurality of spaced fourth trenches are formed between the tip and bottom of the sensor mask device. The adhesive agent between the central supporter and the scanner mask device can flow to the fourth traveling range so that the sensor mask device is further combined with the sensor mask device and the central supporter.

The present invention will be better understood and its numerous objects and advantages will become apparent to those skilled in the art by referencing to the following drawings in which:

DETAILED DESCRIPTION OF THE PREFERRED EMBODIMENT

Figure 1:
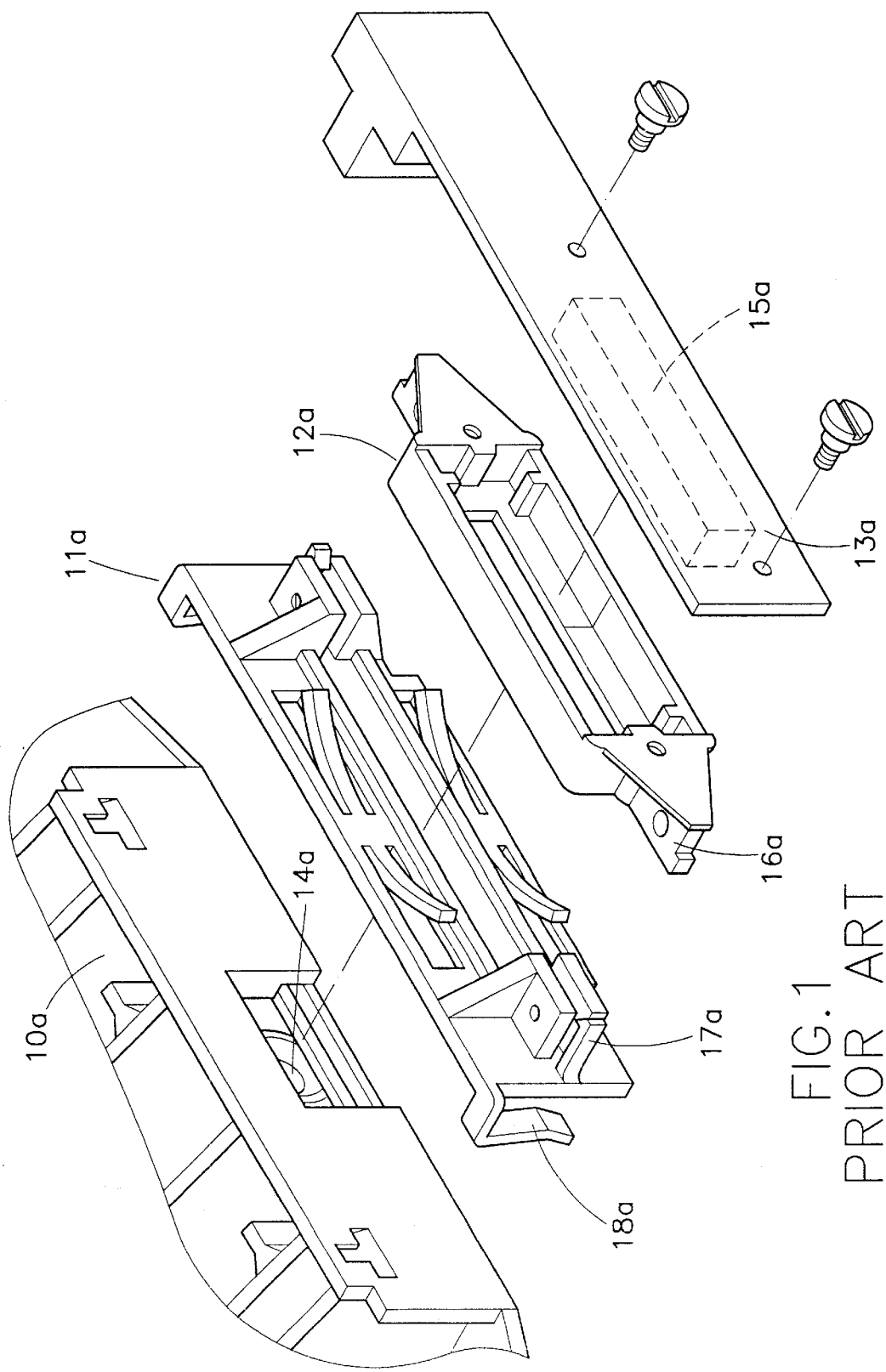
FIG. 1 is a perspective view o the CCD plate.
Figure 2:
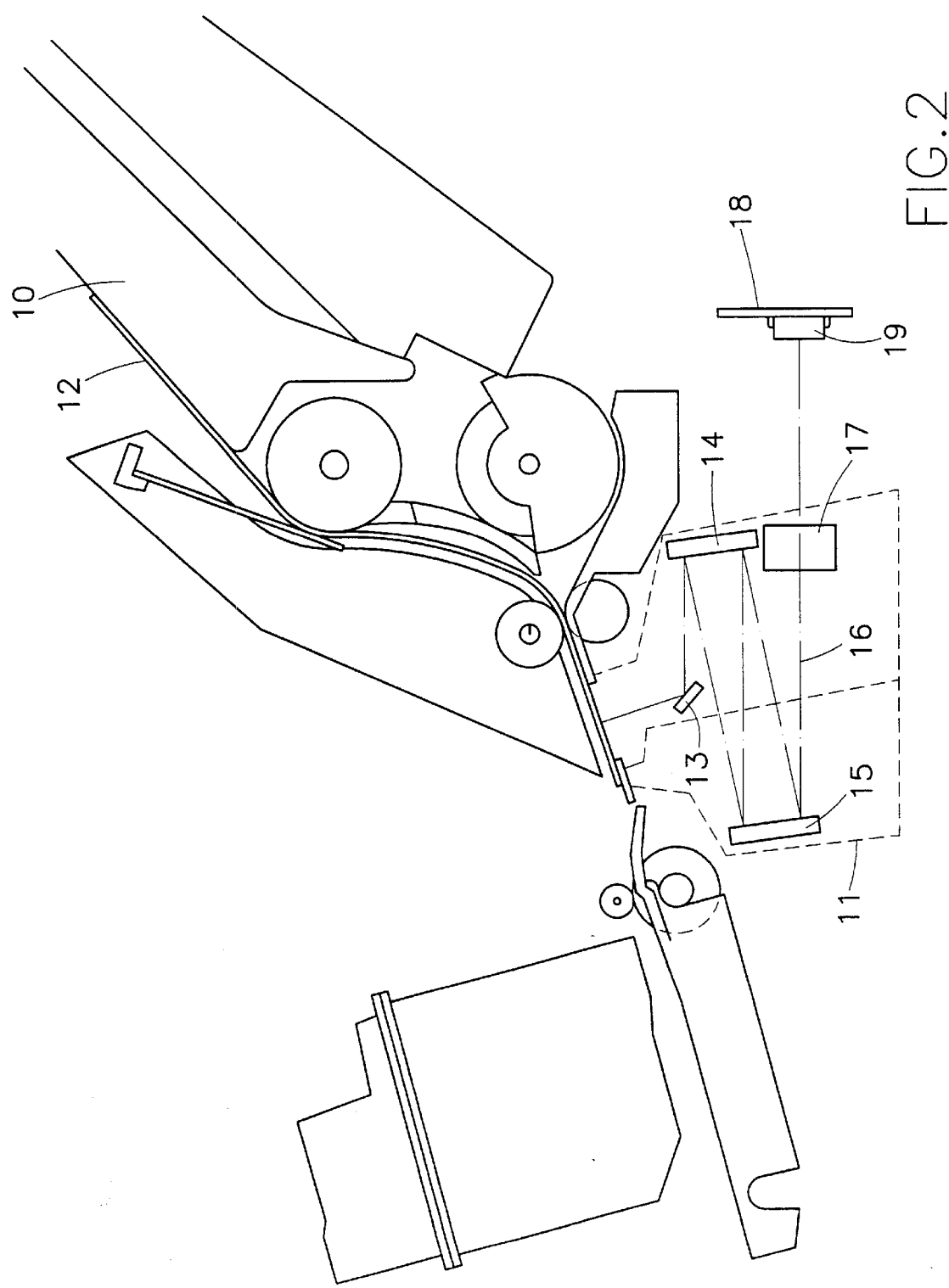
FIG. 2 is a simplified lateral view of an application according to the present invention.

As shown in FIG. 2, the scanner has an automatic paper feeder 10 which serves to feed paper to a scanning device 11 along a paper feeding path for performing optic scanning. The scanning device 11 includes a light source (not shown) for illuminating the surface of the paper to be scanned. Light can be reflected by the reflectors 13, 14 and 15 along an optic path 16 through a lens 17 and then is focused. Then the light is focused to a CCD element 19 fixed to a CCD plate 18 so that the CCD element 19 may convert optic signals into analog or digital signals. In order that the scanning device 11 has an optimum scanning effect, in general the CCD element 19 is aligned with the image light emitted form the lens 17 and is fixed in the proper place.

The present invention relates to a device for fixing a CCD element 19 within a predetermined traveling range. Five degrees of freedom (X direction, Y direction, Z direction, rotary direction around Z axis, rotary direction around Y direction) without needing to moving the lens 17. The fixing of the CCD element 19 is controlled by the five degrees of freedom providing by a sensor mask device and a central supporter.

Figure 3:
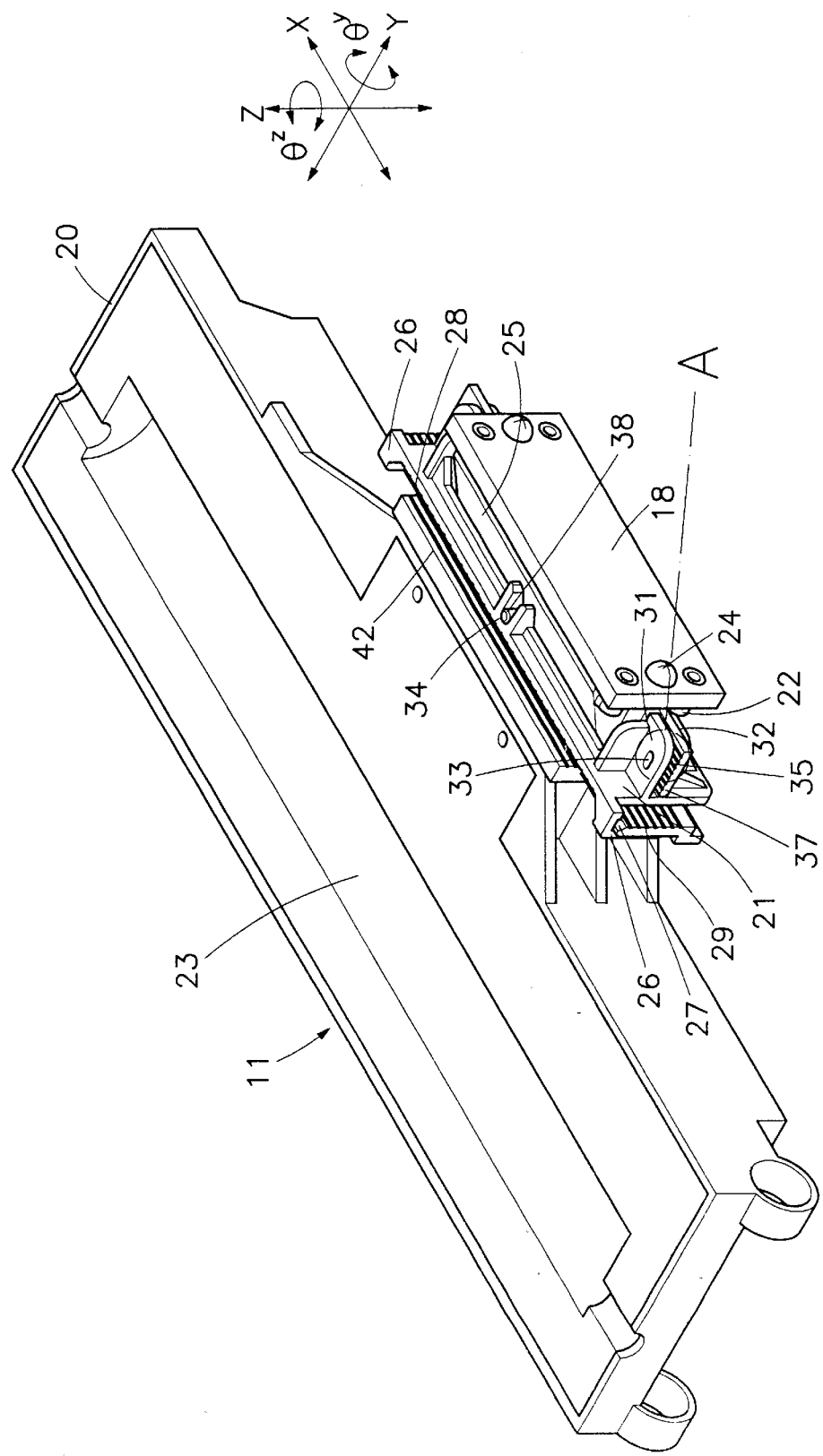
FIG. 3 is a perspective view of the present invention.
Figure 3A:
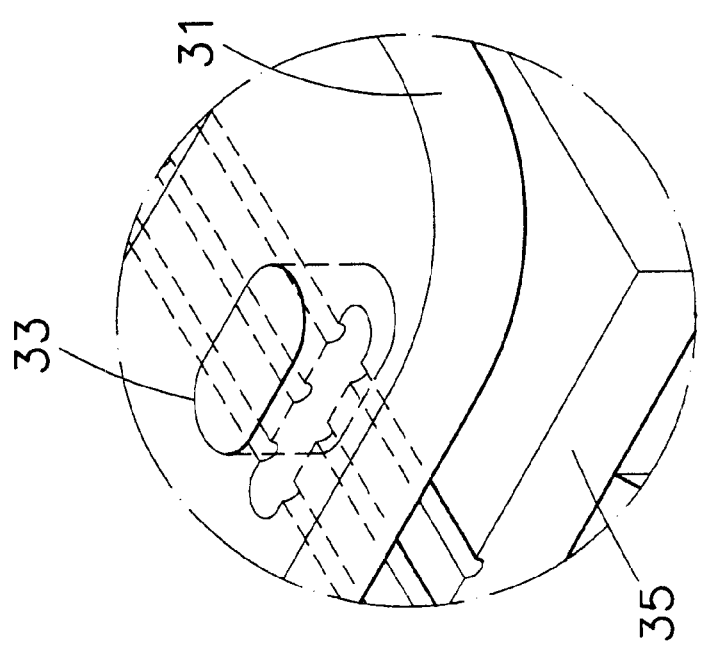
Figure 4:
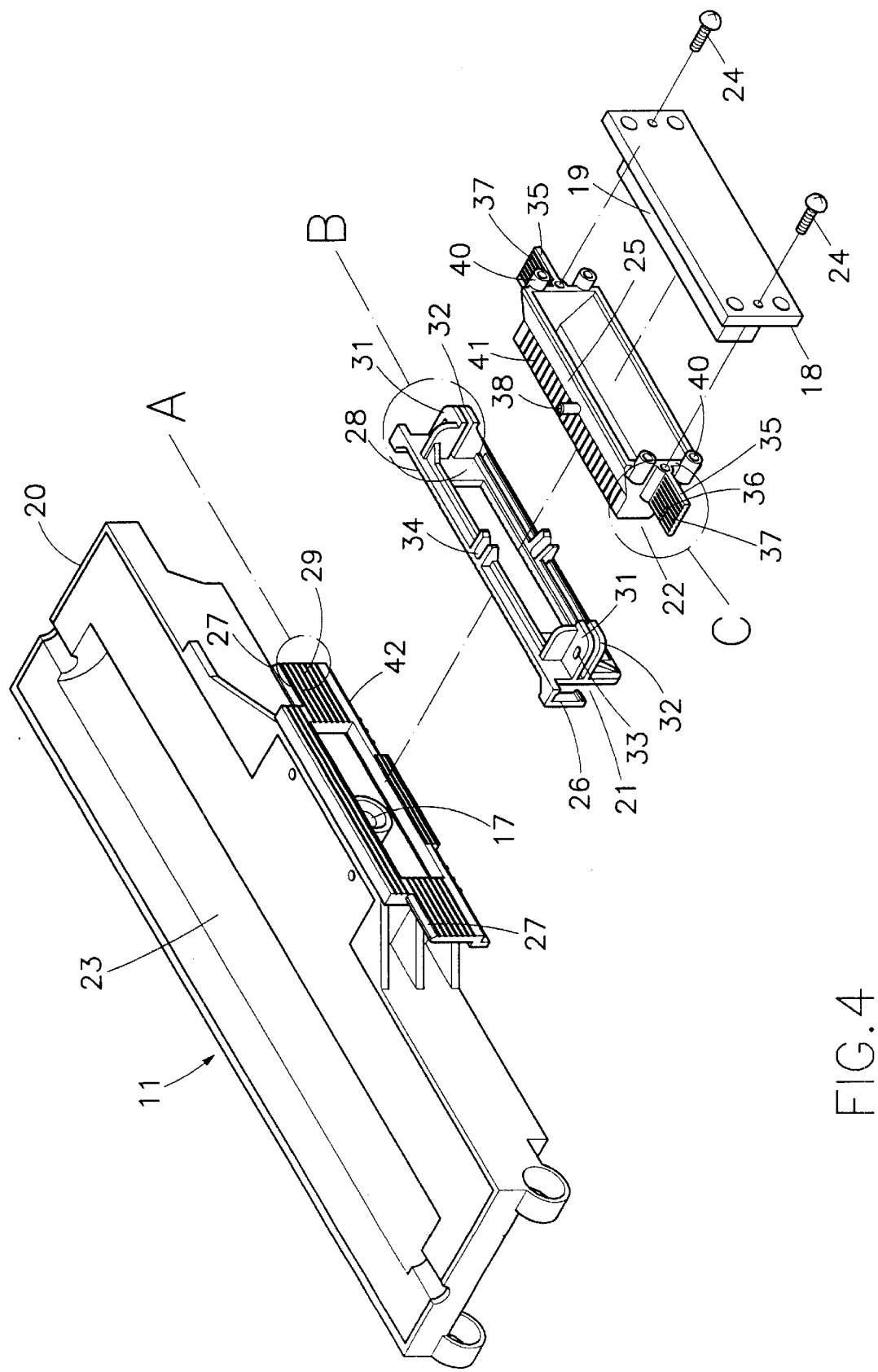
FIG. 4 is an exploded perspective view according to the present invention.
Figure 4B:
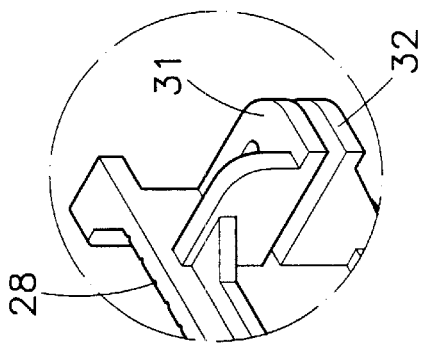
Figure 4C:
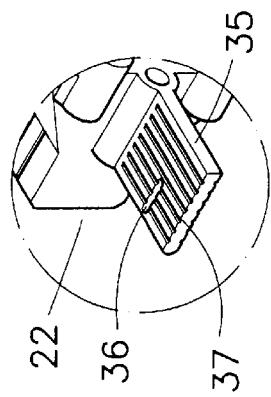
Figure 4A:
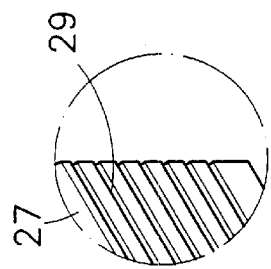
Figure 5:
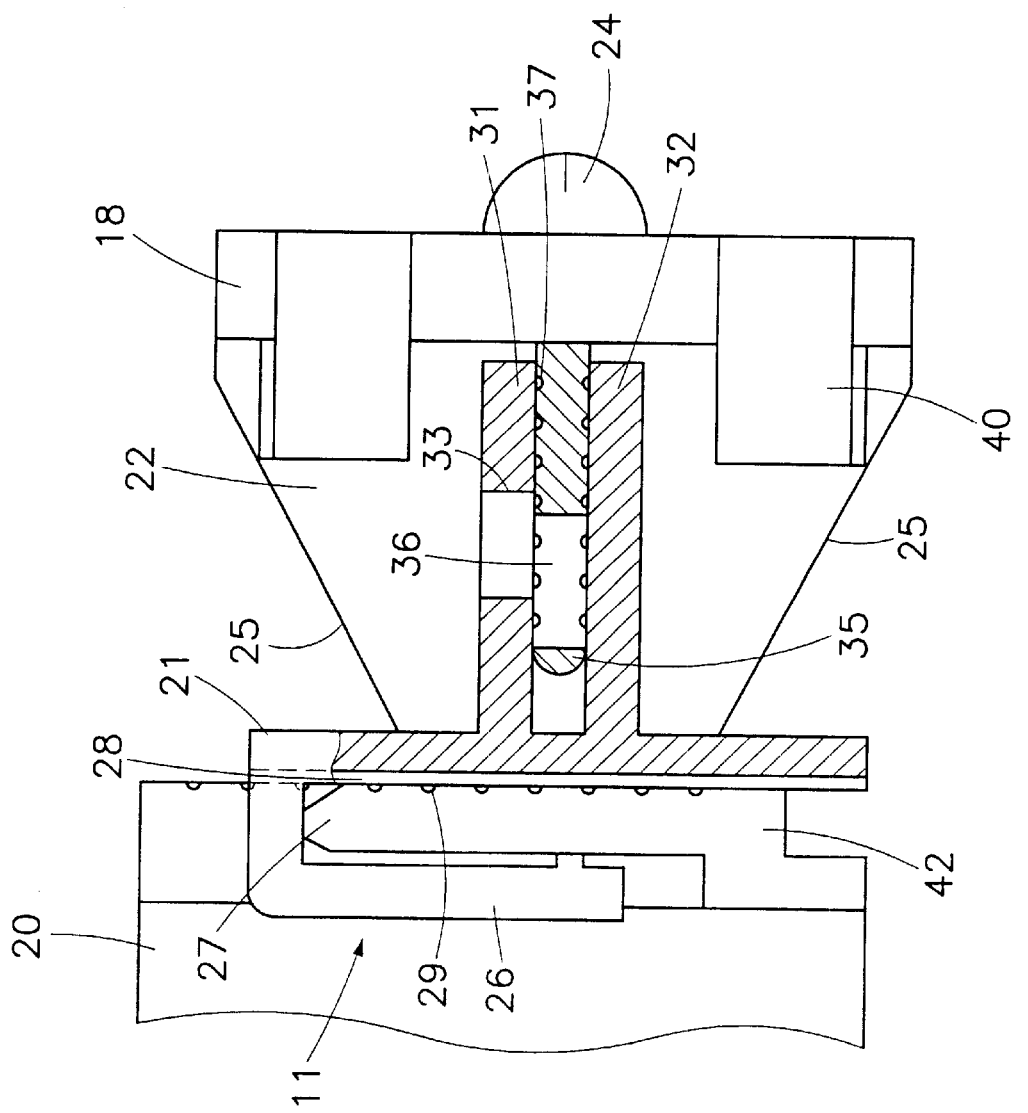
FIG. 5 is a lateral view of the present invention.

As shown in FIGS. 3, 4 and 5, the present invention provides an adjustable fixing device of a CCD plate including a scanning device 11. The scanning device 11 includes a scanner mask device 20, a central supporter 21, and a sensor mask device 22. The scanner mask device 20, central supporter 21, and sensor mask device 22 are made of non-transparency material. The front side and back side of the central supporter 21 are installed with respective scanner mask device 20 and sensor mask device 22. The scanner mask device 20 is further installed with a window with a light source (not, shown) on the scanning section. The CCD plate 18 has a CCD element 19. The CCD plate 18 and the sensor mask device 22 are locked together by a plurality of screws.

The upper corners of the central supporter 21 are installed with a left and a right clamping elements 26 protruded from the front side. The back side of scanner mask device 20 is formed with a rear wall 42 made of non-transparency material. The rear wall 42 is locked by screws or integrally formed to the back side of the scanner mask device 20, the combination thereof may adapted by other ways. Each of the two sides of the rear wall 42 has a concave portion 27. The central supporter 21 can be held into the respective concave portions 27 on the rear wall 42 of the scanner mask device 20 by the clamping element 26 so that a second supporting device formed by the clamping element 26 of the central supporter 21 and the concave portions 27 can be approximately combined to the scanner mask device 20. The central supporter 21 and the scanner mask device 20 may be movably adjustable in a second traveling range. This movement is along the X direction, Z direction and the rotation of Y-axis, as shown in FIG. 3.

Figure 6:
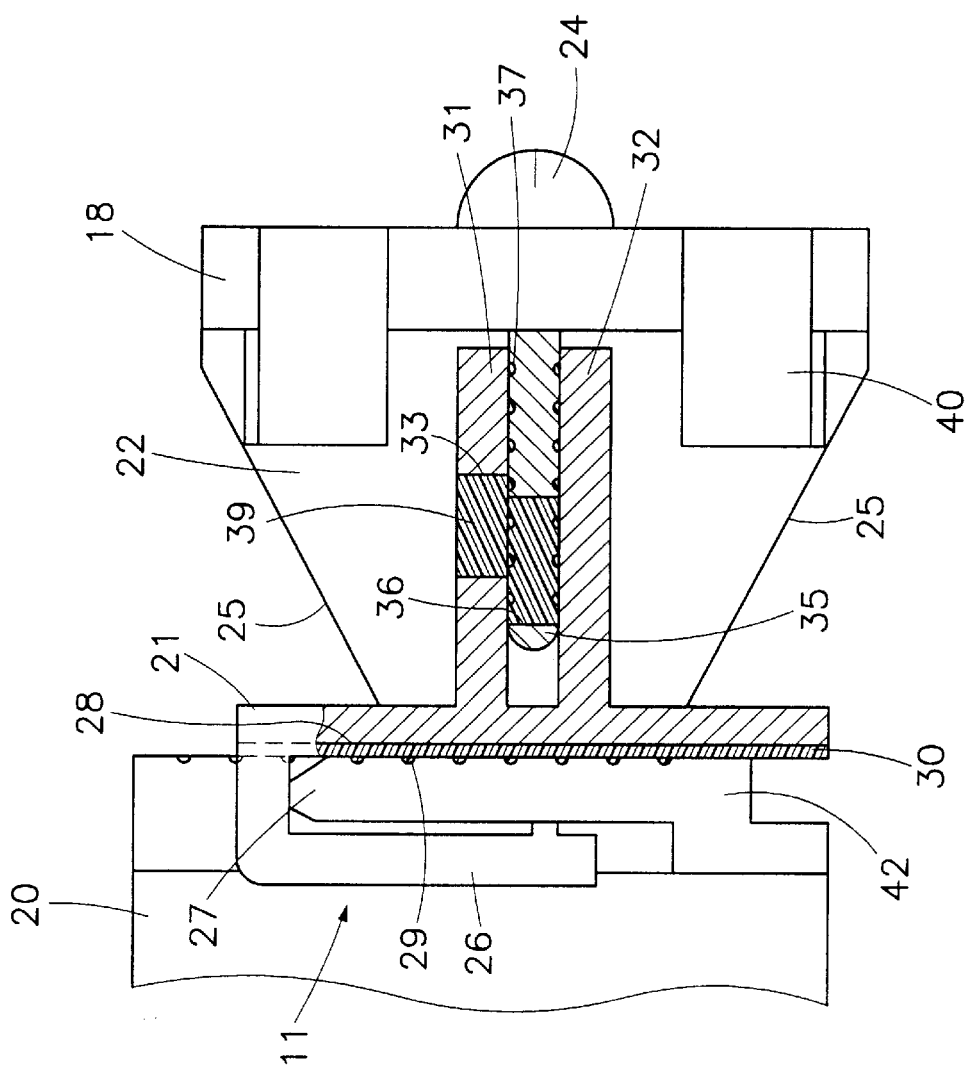
FIG. 6 is a lateral view showing the combination of the present invention.

The front wall of the central supporter 21 is spaced with a plurality of vertical first trenches 28 and a plurality of spaced horizontal second trenches 29 are installed on the rear wall 42 of the scanner mask device 20. The first trenches 28 and the second trenches 29 serve to contain adhesive agent. So that the central supporter 21 and the scanner mask device 20 are fixed to a fix position within the traveling range, and then a liquid second adhesive agent 30 (as shown in FIG. 6) is applied between the first traveling range 28 and the second trenches 29 so that they may be with respect to one another. The adhesive agent is a quick glue, which may flow to a place between the rear wall 42 and the central supporter 21 so that the rear wall 42 of the scanner mask device 20 and the central supporter 21 are fixed therein.

The right and left sides of the rear wall 42 of the central supporter 21 are installed with two respective horizontal clamping pieces 31 and 32. The above clamping pieces 31 are installed with respective through holes 33. The upper and lower portions of the middle rear wall 42 of the central supporter 21 are installed with respective U shape groove holes 34. In the middle of the sensor mask device 22, the upper and lower portions thereof are installed with pillars 38. The sensor mask device 22 are formed with inclined surfaces 25 on the upper and lower portion thereof, while the rear ends thereof are installed with four hollow positioning pillars 40 for positioning fixtures. The left and right sides of the sensor mask device 22 are installed with respective ears 35 each of which is installed with a second through hole 36. The through holes 36 on the top and lower surfaces of the ear 36 are spaced with a plurality of third trenches 37 around the periphery thereof. The through holes 33, second through holes 36 and the third trenches 37 serve to contain an adhesive agent. The sensor mask device 22 may be inserted into the clamping pieces 31 and 32 at the two sides of the central supporter 21. The two pillars 38 of the sensor mask device 22 is conformed with the two grooves 34 of the central supporter 21 so that by the ears 35 and the clamping pieces 31 and 32, the sensor mask device 22 and the grooves 23 and the pillars 38 are formed as a first supporting device which is rough combined to the central supporter 21. Moreover, the central supporter 21 and the sensor mask device 22 may be movably adjusted with respect to one another within the first traveling range. This movement is along the Y direction and the rotation of the Z direction.

The central supporter 21 and the sensor mask device 22 are fixed at a fix position within the traveling range, and then the first adhesive agent 39 (as shown in FIG. 6) is filled into the first through holes and the second through holes so that the relative movement is performed. The adhesive agent is also a quick dry glue to cause that the central supporter 21 and the sensor mask device 22 are fixed to the relative position.

As shown in FIG. 6, after the first adhesive agent 39 and the second adhesive agent 30 is hardened, they will form as a concrete combining agent so that the rear wall 42 of he sensor mask device 22, the central supporter 21 and the sensor mask device 22 are combined tightly in an optic device. Since the combination does not use any screws, therefore, the defect that during screwing the torque and force in the CCD element will cause the CCD element to shift from the preferred positioned position. The central supporter 21 is made of non-transparency material, thus the outer light will not propagate to the inner portion, the central supporter 21 is unnecessary to perform a light shielding process or installed with any shielding element, therefore, the cost is reduced greatly.

Moreover, two inclined surfaces 25 and four positioning pillars 40 are installed on the sensor mask device 22 for positioning fixtures. Besides, the sensor mask device 22 is matched with the two grooves 34 in the central supporter 21 by the two pillars 38 thereof so as to guide the sensor mask device 22 and the central supporter 21 along Y direction and orientation around Z axis.

Another, by the design of the third trenches 37 on the two ears 35 of the sensor mask device 22, the second adhesive agent 39 is filled thereinto for increasing the adhesion area between the ear 35 of the sensor mask device 22 and the clamping pieces 31 and 32 of the central supporter 21. Thus, the combination of the central supporter 21 and the sensor mask device 22 are more tightly combined.

Furthermore, a plurality of fourth trenches 41 are formed in the space between the top and lower surfaces of the sensor mask device 22. When second adhesive agent 30 is filled into the first trenches 28 and the second trenches 29, the second adhesive agent 30 will flow into the fourth trenches 41 so that the sensor mask device 22 is further combined with the rear wall 42 of the sensor mask device 20 and the central supporter 21.

Moreover, the front wall of the central supporter 21 is densely distributed with a plurality of vertical first trenches 28. The rear wall 32 of the scanner mask device 20 is also densely distributed with a plurality of horizontal second trenches 29. The first and second trenches are alternatively arranged and mixed with the adhesive agent 30 for providing a larger and uniform adhesion area. Accordingly, the combination of the rear wall 42 of the scanner mask device 20 and the central supporter 21 become more steady.

In summary, the present invention has effectively improved the prior art defects, such as the central supporter is made by ultraviolet material, the central supporter is necessary to be performed with a light shielding process or installed with light shielding element so as to increase cost, the sensor mask device is not convenient for holding fixture, the cost is higher, the sensor mask device and the central supporter are not well guided and unsteadily, the adhesion area between the sensor mask device and the central supporter is smaller.

Although the present invention has been described using specified embodiment, the examples are meant to be illustrative and not restrictive. It is clear that many other variations would be possible without departing from the basic approach, demonstrated in the present invention.

DESCRIPTION OF THE NUMERALS IN FIGURES

| 10 | Automatic paper feeder |
| 11 | scanning device |
| 12 | Paper |
| 13 | Reflector |
| 14 | Reflector |
| 15 | Reflector |
| 16 | Optic path |
| 17 | Lens |
| 18 | CCD plate |
| 19 | CCD element |
| 20 | scanner mask device |
| 21 | central supporter |
| 22 | sensor mask device |
| 23 | Window |
| 24 | Screw |
| 25 | Inclined surface |
| 26 | Clamping element |
| 27 | concave portion |
| 28 | first trench |

-continued

| 29 | second trench |
| 30 | second adhesive agent |
| 31 | Clamping piece |
| 32 | Clamping piece |
| 33 | first through hole |
| 34 | Groove |
| 35 | Ear |
| 36 | second through hole |
| 37 | third trench |
| 38 | Pillar |
| 39 | first adhesive agent |
| 40 | Positioning pillar |
| 41 | fourth trench |
| 42 | rear wall |
| 10a | scanner mask device |
| 11a | central supporter |
| 12a | sensor mask device |
| 13a | CCD plate |
| 14a | Lens |
| 15a | CCD element |
| 16a | supporting device |
| 17a | supporting device |
| 18a | Clamping element |

What is claimed is:

1. A CCD (charged coupled device) plate adjustable fixing device comprising:

a sensor mask device for supporting the CCD plate, the sensor mask device having a pair of pillars respectively extending from an upper and a lower surface thereof;

a central supporter made of non-transparency material, the central supporter having a rear wall and a pair of groove holes centrally disposed thereon respectively at upper and lower portions thereof for respectively receiving the pillars of the sensor mask therein;

a first supporting device for combining the sensor mask device and the central supporter, and causing the sensor mask device and the central supporter to move with respective one another in a traveling range;

a first adhesive agent filling a space between the sensor mask device and the central supporter for combining the sensor mask device and the central supporter to be fixed in a fixing position within the traveling range.

2. The CCD plate as claimed in claim 1, wherein each of a left and a right side of the sensor mask device is installed with two clamping pieces, each of the left and right sides of the sensor mask device being formed with a respective ear, the two ears of the sensor mask device being respectively inserted into the clamping pieces on the two sides of the central supporter.

3. The CCD plate adjustable fixing device as claimed in claim 2, wherein each of the two upper clamping pieces on two sides of the central supporter is installed with a through hole, each ear of the sensor mask device is formed with a through hole, a plurality of spaced third trenches are installed on the peripheries of the second through holes on the top and lower surfaces of each ear, the first through hole, second through hole and third trenches serves to contain the first adhesion agent.

4. The CCD plate adjustable fixing device as claimed in claim 1, wherein the adhesion agent is a quick dry glue.

5. The CCD plate adjustable fixing device as claimed in claim 1, wherein a scanner mask device is installed in the front side of the central supporter, the scanner mask device and the central supporter are roughly combined by a second supporting device, and the scanner mask device and the central supporter are moved with respect to one another within a traveling range, a second adhesive agent is filled between the scanner mask device and the central supporter for combining the scanner mask device and the central supporter so that they are secured in a fixing position in the traveling range.

6. The CCD plate adjustable fixing device as claimed in claim 5, wherein the upper corners of the central supporter are installed with a left and a right clamping element, the central supporter is held in the two respective concave portions on the scanner mask device by two clamping elements so as to form as a second supporting device.

7. The CCD plate adjustable fixing device as claimed in claim 2, wherein a plurality of spaced vertical first trenches are installed in the front wall of the central supporter, and a plurality of spaced horizontal second trenches are installed in the rear wall of the scanner mask device, the first and second trenches serve to contain the second adhesive agent.

8. The CCD plate adjustable fixing device as claimed in claim 2, wherein the rear wall of the scanner mask device is made of a non-transparency material, the rear wall is locked to or integrally formed in the rear side of the scanner mask device.

9. The CCD plate adjustable fixing device as claimed in claim 2, wherein the scanner mask device is made of non-transparency material.

10. The CCD plate adjustable fixing device as claimed in claim 2, wherein a plurality of fourth trenches are spaced on the top and bottom surfaces of the scanner mask device, the second adhesive agent flows to the fourth trenches so that the sensor mask device is further combined with the central supporter of the scanner mask device.

11. The CCD plate adjustable fixing device as claimed in claim 2, wherein the CCD plate have a CCD element, by a plurality of screws, the CCD plate and the CCD element are combined together.

12. The CCD plate adjustable fixing device as claimed in claim 2, wherein the upper and lower portions of the sensor mask device are installed with inclined surfaces, the a plurality of positioning pillars are protruded from the rear end thereof.

13. The CCD plate adjustable fixing device as claimed in claim 2, wherein the sensor mask device is made of non-transparency material.

\* \* \* \* \*